US010135862B1

(12) United States Patent
McClintock et al.

(10) Patent No.: US 10,135,862 B1
(45) Date of Patent: Nov. 20, 2018

(54) TESTING SECURITY INCIDENT RESPONSE THROUGH AUTOMATED INJECTION OF KNOWN INDICATORS OF COMPROMISE

(71) Applicant: Amazon Technologies, Inc., Seattle, WA (US)

(72) Inventors: Jon Arron McClintock, Seattle, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

(21) Appl. No.: 14/959,618

(22) Filed: Dec. 4, 2015

(51) Int. Cl.
*H04L 29/06* (2006.01)

(52) U.S. Cl.
CPC ........ *H04L 63/145* (2013.01); *H04L 63/1416* (2013.01); *H04L 63/1433* (2013.01); *H04L 63/1466* (2013.01)

(58) Field of Classification Search
CPC ......................... H04L 63/1466; H04L 63/1433
See application file for complete search history.

(56) References Cited

U.S. PATENT DOCUMENTS

| | | | | | |
|---|---|---|---|---|---|
| 5,961,644 | A | * | 10/1999 | Kurtzberg | H04L 63/1433 726/23 |
| 9,686,299 | B2 | * | 6/2017 | Stevenson | H04L 63/1416 |
| 9,686,312 | B2 | * | 6/2017 | Di Pietro | H04L 63/1458 |
| 9,736,177 | B2 | * | 8/2017 | Simpson | G06F 21/577 |
| 9,762,617 | B2 | * | 9/2017 | Modi | H04L 63/20 |
| 9,838,391 | B2 | * | 12/2017 | Jevans | H04L 63/1433 |
| 9,838,426 | B2 | * | 12/2017 | Schwartz | H04L 63/1491 |
| 9,922,196 | B2 | * | 3/2018 | Di Pietro | G06F 21/577 |
| 9,954,884 | B2 | * | 4/2018 | Hassell | H04L 63/1441 |
| 2005/0102534 | A1 | * | 5/2005 | Wong | G06F 21/577 726/4 |
| 2006/0021046 | A1 | * | 1/2006 | Cook | G06F 21/577 726/25 |
| 2009/0099988 | A1 | * | 4/2009 | Stokes | G06F 15/16 706/20 |
| 2010/0154059 | A1 | * | 6/2010 | McNamee | H04L 12/2602 726/23 |

(Continued)

OTHER PUBLICATIONS

Wan et al.; IntruDetector: A Software Platform for Testing Network Intrusion Detection Algorithms; 2001; Retrieved from the Internet <URL: http://ieeexplore.ieee.org/abstract/document/991516/>; pp. 1-9 as printed.*

(Continued)

*Primary Examiner* — Saleh Najjar
*Assistant Examiner* — Michael W Chao
(74) *Attorney, Agent, or Firm* — Thomas | Horstemeyer, LLP (57) ABSTRACT

Disclosed are various embodiments for testing the security incident response of an organization through automated injection of a known indicator of compromise. A stream of event data generated by a network monitoring system of an organization is received. The stream of event data is modified to include data embodying a fabricated indicator of compromise. The stream of event data that has been modified is then provided to an intrusion detection system of the organization. Metrics are then generated that assess the response of the organization to the fabricated indicator of compromise.

20 Claims, 5 Drawing Sheets

(56) References Cited

U.S. PATENT DOCUMENTS

| | | | | |
|---|---|---|---|---|
| 2012/0042383 A1* | 2/2012 | Greene | ............... | G06F 21/57 |
| | | | | 726/25 |
| 2013/0014264 A1* | 1/2013 | Kennedy | ............... | H04L 41/22 |
| | | | | 726/25 |
| 2013/0097706 A1* | 4/2013 | Titonis | ............... | G06F 21/56 |
| | | | | 726/24 |
| 2014/0230065 A1* | 8/2014 | Belani | ............... | H04L 63/1433 |
| | | | | 726/25 |
| 2015/0052606 A1* | 2/2015 | Romero Bueno | .. | H04L 63/1425 |
| | | | | 726/23 |
| 2015/0138993 A1* | 5/2015 | Forster | ............... | H04L 41/12 |
| | | | | 370/248 |
| 2015/0278057 A1* | 10/2015 | He | ............... | G06F 11/263 |
| | | | | 714/33 |
| 2015/0295948 A1* | 10/2015 | Hassell | ............... | H04L 63/1441 |
| | | | | 726/25 |
| 2017/0264631 A1* | 9/2017 | Eggert | ............... | G06F 21/50 |
| 2018/0025157 A1* | 1/2018 | Titonis | ............... | G06F 21/56 |

OTHER PUBLICATIONS

No stated author; SANS Top-20; 2009; Retrieved from the Internet <URL: https://web.archive.org/web/20090728104858/http://www.sans.org/top20/>; pp. 1-39 as printed.*

* cited by examiner

TESTING SECURITY INCIDENT RESPONSE THROUGH AUTOMATED INJECTION OF KNOWN INDICATORS OF COMPROMISE

BACKGROUND

Organizations often deploy intrusion detection systems on their networks to detect malicious activities or violations of policy. Monitoring systems generate streams of event data that represent a variety of events occurring on the network or on hosts coupled to the network. For example, the events can correspond to network connections, programs executed on hosts, files downloaded to hosts, bandwidth usage, processor usage, and other events. Intrusion detection systems examine these events using rule-based analysis to determine whether they correspond to intrusion profiles. When malicious activities or policy violations are detected, automated remedial actions can be performed and/or security administrators can be notified.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure introduces approaches for testing the security incident response of an organization through automated injection of known indicators of compromise to an intrusion or anomaly detection system. Intrusion or anomaly detection systems operate by analyzing events gathered from a networked environment to determine whether they match an indicator of compromise. An indicator of compromise corresponds to structured information that describes how to detect an attack or compromise. Indicators of compromise can be obtained via feeds from external sources or can be manually created by security administrators.

Testing the security incident response of an organization can be difficult. Under one approach, a simulated attack on the organization's network can be staged. However, staging such an attack may adversely affect the operation of the network. For example, circulating a known malware file may result in inadvertent infection of hosts. Under another approach, a fake entry in an incident response system may be created to test the response of humans on a security administration team. Yet, such an approach would not test the underlying intrusion detection system and any automated defenses.

Various embodiments of the present disclosure introduce approaches for testing the security incident response of an organization in an automated manner. To this end, a known indicator of compromise can be injected into an event stream for processing by an intrusion detection system. The intrusion detection system is configured to recognize this indicator of compromise and raise alarms or enable defenses. An incident response system can process the alarms and notify security administrators. A security incident response testing service can measure the response times of the security administrators, and the testing service can also assess the actions taken by the security administrators for effectiveness. Further, the testing service can assess the effect of any automated defenses.

Figure 1:
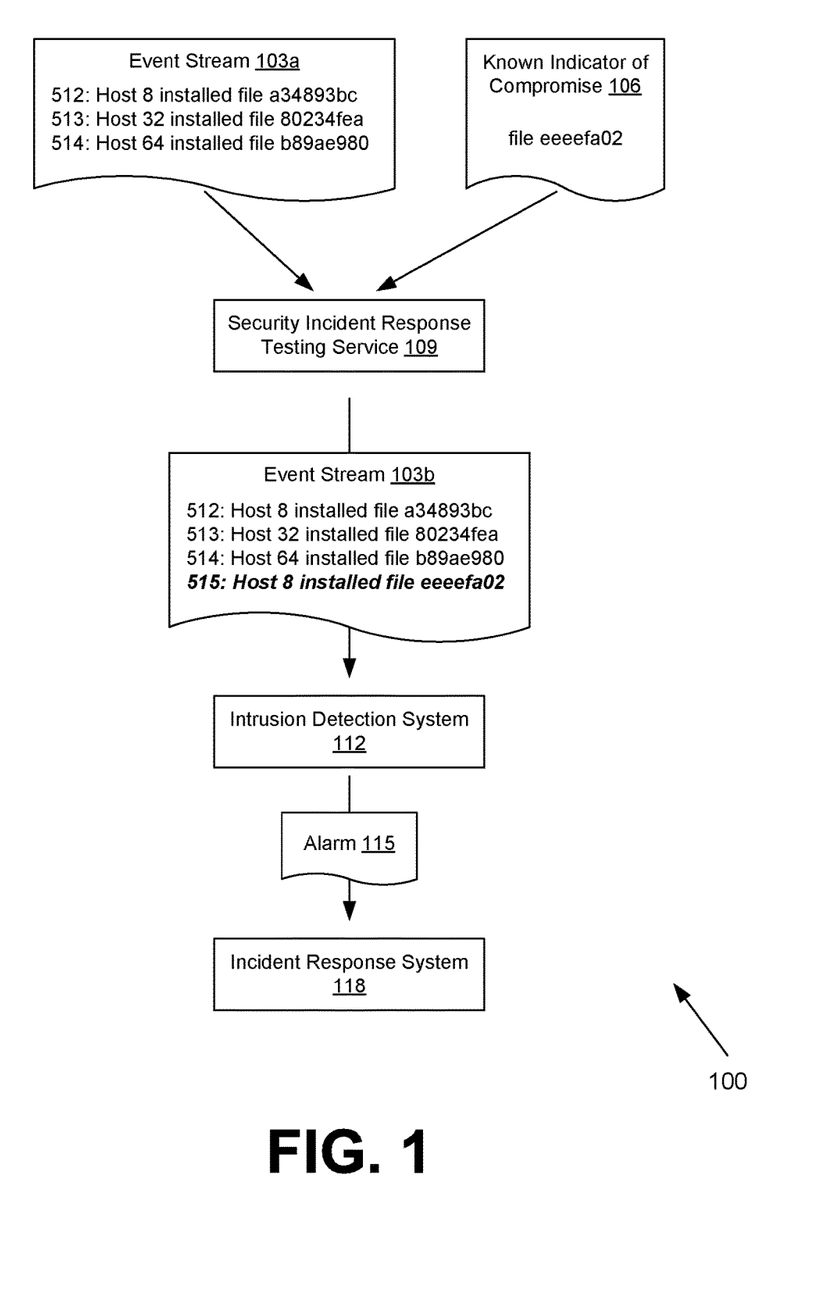
FIG. 1 is a diagram of an example scenario involving a security incident response test according to various embodiments of the present disclosure.

Turning now to FIG. 1, shown is an example scenario 100 involving a security incident response test according to various embodiments of the present disclosure. To begin, an event stream 103a and a known indicator of compromise 106 are provided to a security incident response testing service 109. The event stream 103a includes multiple events that are logged by one or more network monitoring services. In this non-limiting example, the event stream 103a documents installation of three files by three different hosts on the network of an organization. The specific files involved are represented by a signature, such as a hash code. The known indicator of compromise 106 indicates a signature for a specific file that has been identified as malware.

From these inputs, the security incident response testing service 109 generates an updated event stream 103b in order to test the security incident response of the organization. In the updated event stream, a fabricated indicator of compromise has been added, which corresponds to the known indicator of compromise 106. In this non-limiting example, the security incident response testing service 109 adds a fake event to the event stream 103b indicating that a particular host on the network ("host 8") has installed a file with a signature corresponding to the signature of the known indicator of compromise 106.

The event stream 103b that has been modified is then provided to an intrusion detection system 112 of the organization. The intrusion detection system 112 is configured to process the event stream 103b to recognize indicators of compromise, including the known indicator of compromise 106. Upon recognizing the known indicator of compromise 106 represented in the event stream 103b, the intrusion detection system 112 may generate an alarm 115 and/or perform other automated actions directed at safeguarding the network. The alarm 115 can be provided to an incident response system 118, which can escalate the matter for human review and resolution by one or more security administrators.

After modifying the event stream 103b, the security incident response testing service 109 begins assessing the effectiveness of the security incident response of the organization to the fabricated indicator of compromise. To this end, the security incident response testing service 109 may track the time required for the intrusion detection system 112 to generate the alarm 115 and/or take other actions. Also, the security incident response testing service 109 may track the time for a security administrator to log in to the incident response system 118, identify that the known indicator of compromise 106 is a false alarm, or complete other responsive actions. Moreover, the security incident response testing service 109 can assess whether a security administrator performs various investigative tasks that would be expected (e.g., logging into a console, examining files installed on a host, etc.). In the following discussion, a general description of the system and its components is provided, followed by a discussion of the operation of the same.

Figure 2:
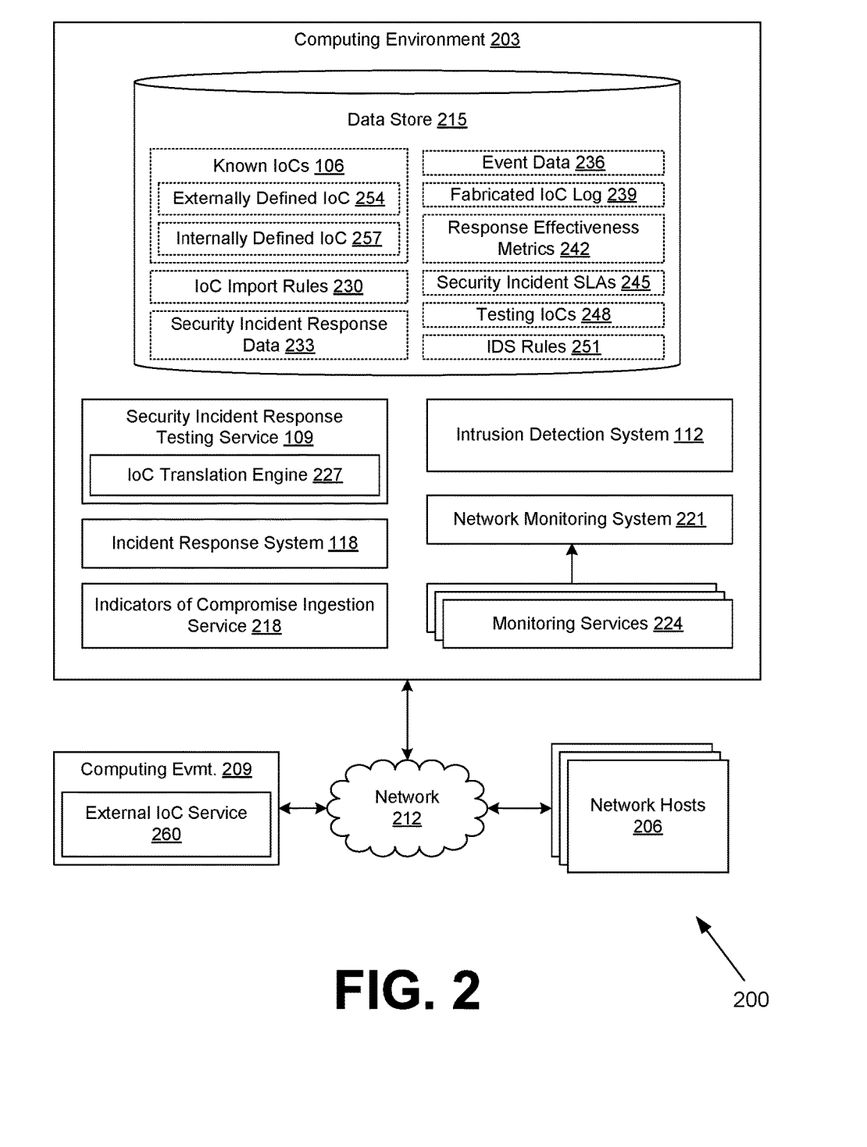
FIG. 2 is a schematic block diagram of a networked environment according to various embodiments of the present disclosure.

With reference to FIG. 2, shown is a networked environment 200 according to various embodiments. The networked environment 200 includes a computing environment 203, a plurality of network hosts 206, and a computing environment 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include an indicators of compromise ingestion service 218, a network monitoring system 221, a plurality of monitoring services 224, a security incident response testing service 109, an intrusion detection system 112, an incident response system 118, and other applications, services, processes, systems, engines, or functionality not discussed in detail herein. The indicators of compromise ingestion service 218 is executed to receive data describing known indicators of compromise from internal and/or external sources. For example, the indicators of compromise ingestion service 218 may receive periodic data feeds from other organizations using structured thread information expression (STIX), trusted automated exchange of indicator information (TAXII), and/or other formats and protocols. The indicators of compromise ingestion service 218 may choose to include or exclude various indicators of compromise provided by external sources based at least in part on predefined rules.

The network monitoring system 221 is executed to monitor various aspects of operation of the network 212 and/or the network hosts 206. In this regard, the network monitoring system 221 may function to aggregate streams of event data generated by the monitoring services 224. For example, one monitoring service 224 may track network connections through a particular firewall on the network 212, while another monitoring service 224 may track log-ins on one or more network hosts 206. Monitoring services 224 may provide network connection pair data, actual packet data from the network 212, sniffed packet headers, file hashes, and/or other event data. The network monitoring system 221, through aggregation, may summarize or condense the streams of event data from the monitoring services 224 into fewer streams of event data.

The intrusion detection system 112 is executed to process the streams of event data from the network monitoring system 221 through a rule-based analysis. In this rule-based analysis, the intrusion detection system 112 looks for anomalies in the streams of event data that are correlated to known indicators of compromise. As an example, the intrusion detection system 112 may identify outbound network traffic to an internet protocol (IP) address corresponding to a known malware command and control network. As another example, the intrusion detection system 112 may identify inbound network traffic from an IP address corresponding to a known botnet. As still another example, the intrusion detection system 112 may identify an installation of files on network hosts 206 that correspond to known malware files.

Also, the intrusion detection system 112 may cause one or more automated actions to be performed in response to detecting a known indicator of compromise. Such actions may include configuring a router or firewall to remove access to the network 212 for one or more network hosts 206, quarantining suspicious files on a network host 206 (e.g., so that the files cannot easily be executed), configuring a router or firewall to block inbound or outbound network access for one or more network addresses or ports, or other actions.

The incident response system 118 is executed to facilitate management of security incidents by human users who are security administrators. In this regard, the incident response system 118 may include task tracking and ticket management functionality. The incident response system 118 may send emails, text messages, pages, voice messages, or other communications to alert security administrators to urgent incidents. The incident response system 118 can include functionality to score incidents according to severity, record remedial actions taken, escalate to other users, and mark tasks as resolved.

The security incident response testing service 109 is executed to perform automated testing of an organization's response to security incidents. To this end, the security incident response testing service 109 automatically injects known indicators of compromise into a stream of events destined for processing by the intrusion detection system 112. Subsequently, the security incident response testing service 109 observes the response by the organization to the false alarm. In observing the response, the security incident response testing service 109 may monitor automated actions invoked by the intrusion detection system, determine resource availability impacts of the organization's response, monitor actions invoked by system administrator users, and monitor the timeliness of the human response. The security incident response testing service 109 may generate one or more metrics indicating the effectiveness of the organization's response.

In some cases, the security incident response testing service 109 can include functionality that aborts an ongoing test. This may be useful if an adverse impact to resource availability is detected. To abort a test, the security incident response testing service 109 may notify a security administrator of the test or undo or disable various actions performed by the intrusion detection system 112.

The security incident response testing service 109 can include an indicator of compromise translation engine 227. The indicator of compromise translation engine 227 is executed to translate a known indicator of compromise into a fake event for inclusion in a stream of event data. In this regard, the indicator of compromise translation engine 227 may have access to data regarding the computing environment 203 in order to create a believable fake event, e.g., with legitimate addresses on the network 212, in a correct event format, etc.

The data stored in the data store 215 includes, for example, known indicators of compromise 106, indicators of compromise import rules 230, security incident response data 233, event data 236, a fabricated indicator of compromise log 239, response effectiveness metrics 242, security incident service-level agreements (SLAs) 245, testing indicators of compromise 248, intrusion detection system (IDS) rules 251, and potentially other data. The known indicators of compromise 106 correspond to structured information that describes one or more items of data or conditions that may be used to identify a potential security compromise. The known indicators of compromise 106 may include, for example, uniform resource locators (URLs), Internet protocol (IP) addresses, or domain names that are accessed by malware programs, file signatures corresponding to malware files, names of processes corresponding to malware processes, kernel modules corresponding to malware, and so on. The known indicators of compromise 106 can include externally defined indicators of compromise 254 and internally defined indicators of compromise 257.

The externally defined indicators of compromise 254 are those indicators that are obtained from external organizations that share information about such indicators. The internally defined indicators of compromise 254 are those that are manually specified by security administrators or are automatically identified by an intrusion detection system 112 in conjunction with one or more machine learning models. For example, the intrusion detection system 112 may identify an unacceptable level of traffic destined for a certain external network address. Consequently, the intrusion detection system 112 may automatically add the external network address as an internally defined indicator of compromise 257.

The indicator of compromise import rules 230 are rules that may control whether known indicators of compromise 106 that are received from external sources are added to the database of known indicators of compromise 106 in the data store 215. For example, an organization may choose to ignore certain types of indicators of compromise provided by an external source that may be unreliable. Alternatively, the organization may automatically import only those externally defined indicators of compromise 254 which are classified with a certain severity, while others may be subject to a manual review.

The security incident response data 233 may document actions taken by the intrusion detection system 112 or by human users via the incident response system 118 in responding to an identified security incident. The event data 236 includes a stream of event data generated by the network monitoring system 221. The security incident response testing service 109 may insert fake events into the event data 236. The fabricated indicator of compromise log 239 may document the injection of fabricated events into the event data 236 by the security incident response testing service 109. The fabricated indicator of compromise log 239 may be used to back out or remove the fabricated events from the event data 236 at a later time if desired. Further, the fabricated indicator of compromise log 239 may be used to confirm whether a particular indicator of compromise identified from the event data 236 is indeed a false alarm.

The response effectiveness metrics 242 are generated by the security incident response testing service 109 to measure the effectiveness of the organization's response to the test. The security incident service level agreement 245 may define acceptable response metrics, such as acceptable timeliness for an automated response to an alarm, acceptable timeliness for a human response to an alarm, acceptable timeliness for a human to identify that the security incident is a false alarm, and so on. The effectiveness of the organization's response may be quantified by comparing measured or observed actions to the security incident SLAs 245.

The testing indicators of compromise 248 are those known indicators of compromise 106 that are selected for testing purposes to be used in fake events in the event data 236 by the security incident response testing service 109. For example, certain types of known indicators of compromise 106 may be acceptable, while others if used would have an unacceptable result (e.g., the intrusion detection system 112 shutting down access to production systems on the network 212). The intrusion detection system rules 251 correspond to the rule set by which the intrusion detection system 112 identifies potential security compromises and takes remedial actions.

The network hosts 206 are representative of a plurality of client or server devices that may be coupled to the network 212. The network hosts 206 may comprise, for example, a processor-based system such as a computer system. Such a computer system may be embodied in the form of a server, a router, a firewall, a desktop computer, a laptop computer, personal digital assistants, cellular telephones, smartphones, set-top boxes, music players, web pads, tablet computer systems, game consoles, electronic book readers, or other devices.

The computing environment 209 may comprise, for example, a server computer or any other system providing computing capability. Alternatively, the computing environment 209 may employ a plurality of computing devices that may be arranged, for example, in one or more server banks or computer banks or other arrangements. Such computing devices may be located in a single installation or may be distributed among many different geographical locations. For example, the computing environment 209 may include a plurality of computing devices that together may comprise a hosted computing resource, a grid computing resource, and/or any other distributed computing arrangement. In some cases, the computing environment 209 may correspond to an elastic computing resource where the allotted capacity of processing, network, storage, or other computing-related resources may vary over time.

Various applications and/or other functionality may be executed in the computing environment 209 according to various embodiments. The components executed on the computing environment 209, for example, include an external indicator of compromise service 260 and other applications, services, processes, systems, engines, or functionality not discussed in detail herein. The external indicator of compromise service 260 is executed to provide data feeds of known indicators of compromise 106 to other organizations.

Figure 3:
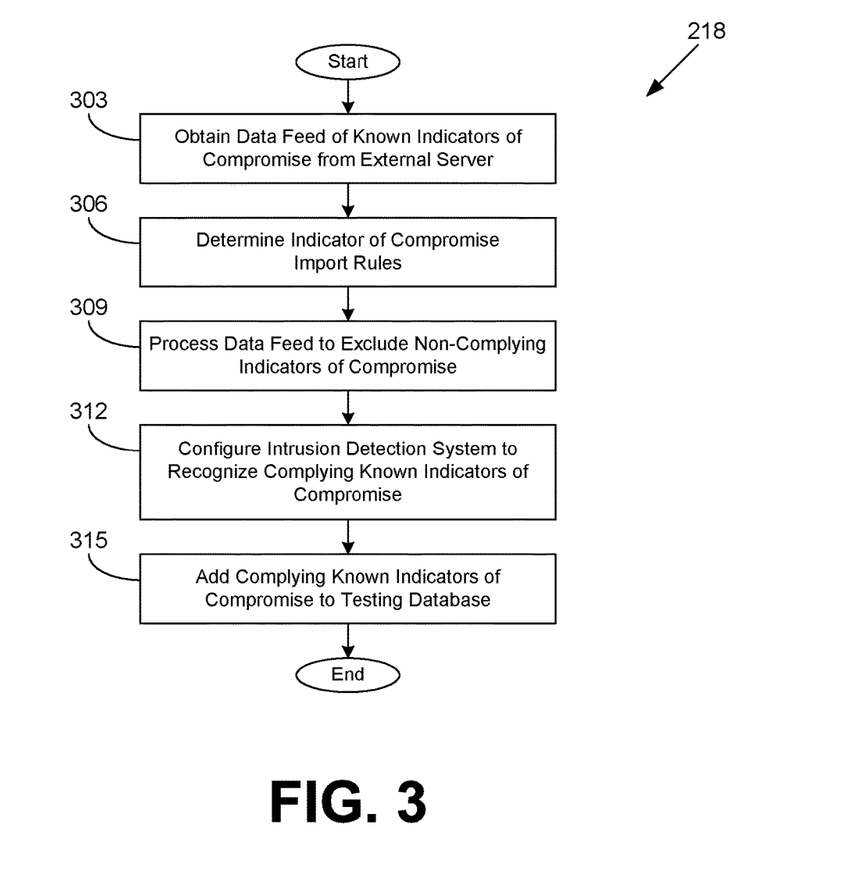
FIG. 3 is a flowchart illustrating one example of functionality implemented as portions of an indicators of compromise ingestion service executed in a computing environment in the networked environment of FIG. 2 according to various embodiments of the present disclosure.

Referring next to FIG. 3, shown is a flowchart that provides one example of the operation of a portion of the indicators of compromise ingestion service 218 according to various embodiments. It is understood that the flowchart of FIG. 3 provides merely an example of the many different types of functional arrangements that may be employed to implement the operation of the portion of the indicators of compromise ingestion service 218 as described herein. As an alternative, the flowchart of FIG. 3 may be viewed as depicting an example of elements of a method implemented in the computing environment 203 (FIG. 2) according to one or more embodiments.

Beginning with box 303, the indicators of compromise ingestion service 218 obtains a data feed of known indicators of compromise 106 (FIG. 1) from an external indicators of compromise service 260 (FIG. 2) over an external portion of the network 212 (FIG. 2). In box 306, the indicators of compromise ingestion service 218 determines indicator of compromise import rules 230 (FIG. 2) that pertain to the received data feed and/or source entity. In box 309, the indicators of compromise ingestion service 218 processes the data feed to exclude non-complying indicators of compromise. For example, a particular indicator of compromise import rule 230 may define certain network addresses as on a whitelist. Thus, if the data feed includes an indicator of compromise as being network traffic originating from one of those certain network addresses, the indicator of compromise may be rejected.

In box 312, the indicators of compromise ingestion service 218 configures the intrusion detection system 112 (FIG. 1) to recognize complying known indicators of compromise 106. The complying known indicators of compromise 106 may be added to the data store 215 (FIG. 2) as externally defined indicators of compromise 254 (FIG. 2). In configuring the intrusion detection system 112, one or more intrusion detection system rules 251 (FIG. 2) may be automatically generated. Based at least in part on the type of indicator of compromise, an appropriate action may be implemented by the intrusion detection system rule 251.

In box 315, the indicators of compromise ingestion service 218 adds the complying known indicators of compromise 106 to the testing indicators of compromise 248 (FIG. 2) for future use in security incident response testing. Predefined rules may configure which types of known indicators of compromise 106 are suitable for security incident response testing purposes, as certain types may have an adverse impact on the network 212 or network hosts 206 and consequently may be unsuitable. Thereafter, the operation of the portion of the indicators of compromise ingestion service 218 ends.

Figure 4:
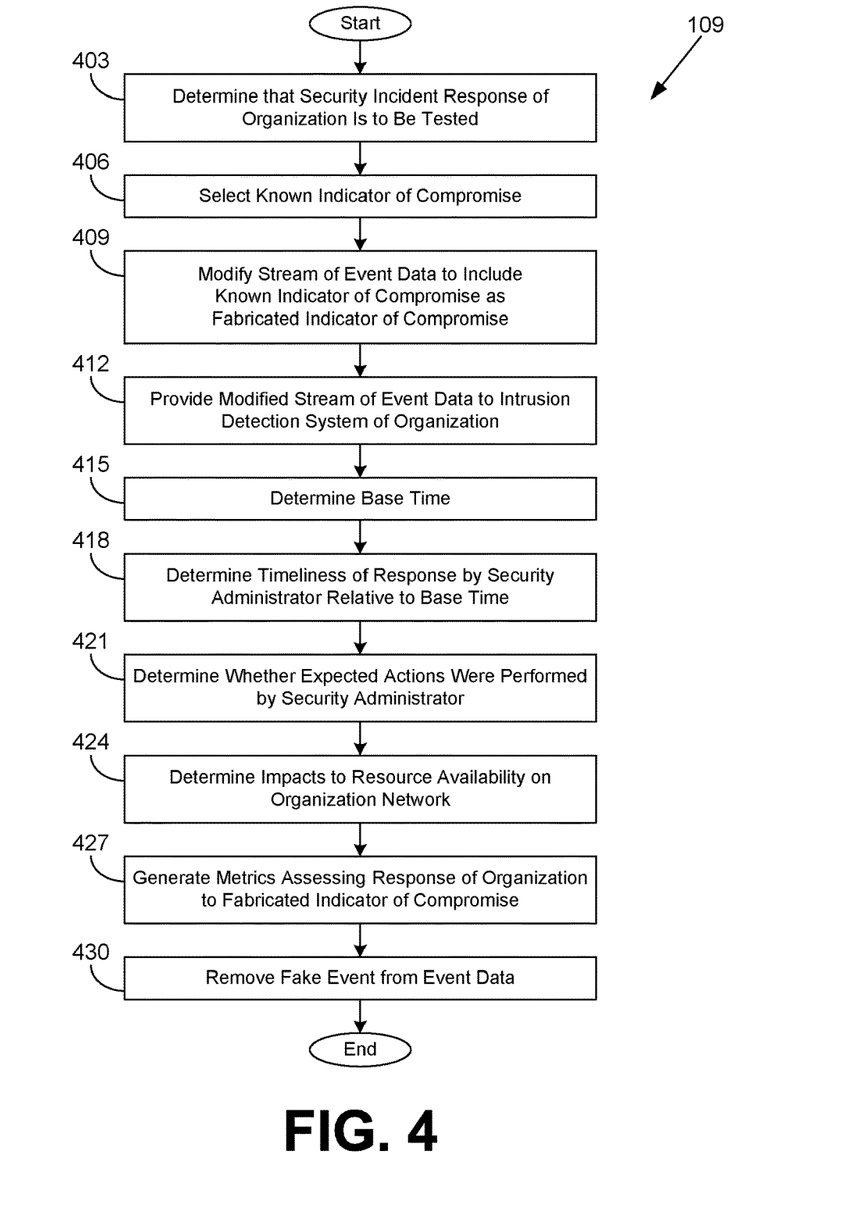
FIG. 4 is a flowchart illustrating one example of functionality implemented as portions of a security incident response testing service executed in a computing environment in the networked environment of FIG. 2 according to various embodiments of the present disclosure.

Moving on to FIG. 4, shown is a flowchart that provides one example of the operation of a portion of the security incident response testing service 109 according to various embodiments. It is understood that the flowchart of FIG. 4 provides merely an example of the many different types of functional arrangements that may be employed to implement the operation of the portion of the security incident response testing service 109 as described herein. As an alternative, the flowchart of FIG. 4 may be viewed as depicting an example of elements of a method implemented in the computing environment 203 (FIG. 4) according to one or more embodiments.

Beginning with box 403, the security incident response testing service 109 determines that the security incident response of an organization is to be tested. For example, the security incident response may be tested at random intervals, at predefined times, or in response to a manual request. In box 406, the security incident response testing service 109 selects one of more known indicators of compromise 106 from the testing indicators of compromise 248 (FIG. 2). The selection may be randomized and/or may be driven by a manual specification or selection. For example, the selected indicator of compromise may be a signature of a malware file, a destination address corresponding to a malware control server, or other types of indicators of compromise.

In box 409, the security incident response testing service 109 modifies a stream of event data 236 to include the selected known indicator of compromise 106 as a fabricated indicator of compromise for testing purposes. In doing so, the security incident response testing service 109 may invoke the indicator of compromise translation engine 227 (FIG. 2) to produce a fake event with details pertinent to the computing environment 203 or the network hosts 206 (FIG. 2), where the fake event embodies the selected known indicator of compromise 106.

In box 412, the security incident response testing service 109 provides the modified stream of event data 236 to the intrusion detection system 112 of the organization. The security incident response testing service 109 may document the fake data with a discreet flag or via a fabricated indicator of compromise log 239 (FIG. 2). The security incident response testing service 109 records a base time relative to the fabricated indicator of compromise injection in box 415.

Subsequently, the intrusion detection system 112, as configured, detects the known indicator of compromise 106 in the event data 236 and performs one or more actions in response, e.g., raising alarms, quarantining files, shutting down part of the network 212, or other actions. One or more human users corresponding to the security administrators of the organization can be summoned and tasked with investigating the purported security compromise. The users may interact with task tracking functionality of the incident response system 118 (FIG. 1) to perform their investigation. Ultimately, the users should conclude that the injected known indicator of compromise 106 is a false alarm and indicate such through the incident response system 118.

In box 418, the security incident response testing service 109 may determine the timeliness of the response by the security administrator(s) relative to the recorded base time. For example, the security incident response testing service 109 may determine how much time elapsed between the injection of the known indicator of compromise 106 and a time when the security administrator indicated that the matter was being investigated or a later time when the security administrator indicated that the incident was a false alarm. The security incident response testing service 109 may also determine time needed for the automated functions of the intrusion detection system 112 to respond, where such automated functions are not performed at a predefined time.

In box 421, the security incident response testing service 109 determines whether certain expected actions were performed by the security administrator(s). For example, the security administrator(s) may be expected to log into a console, perform a network scan, inspecting the resources involved, or perform other investigative tasks in understanding the detected security incident. Omission of such tasks, depending on the type of known indicator of compromise 106, may indicate an improper or less than effective response to the detected security incident.

In box 424, the security incident response testing service 109 determines impacts (if any) to a resource availability on the network 212 (FIG. 2) of the organization. For example, the intrusion detection system 112 or the security administrator may take actions such as blocking access to network hosts 206 or blocking access for certain users, which may adversely impact operations of the organization. Other impacts to resource availability may include decreased network throughput, increased network latency, lower packet delivery reliability, impaired functionality (e.g., a network host 206 can access only a reduced set of services, a service such as a web site may be put in a read-only mode), and other impacts. The security incident response testing service 109 may determine whether the impact is prudent given the circumstances.

In box 427, the security incident response testing service 109 generates one or more response effectiveness metrics 242 (FIG. 2) assessing the response of the organization to the fabricated indicator of compromise. For example, the security incident response testing service 109 may compare the response time of the security administrator to a defined security incident SLA 245 (FIG. 2). The comparison may be a basis for a scoring of the response. The score may also take into account any impacts to resource availability (where large impacts would be associated with a lesser quality response), and whether expected investigative actions were performed (where omission of such actions would be associated with a lesser quality response). The score may also take into account what documentation was provided by the security administrator via the incident response system 118. The score may be a numerical score, a percentage score, a pass/fail score, or another type of score.

The response effectiveness metrics 242 may be stored in the data store 215 and/or presented in a user interface, such as a network page or web page. In some cases, the response effectiveness metrics 242 may compare or contrast the responses of individual security administrator users. The response effectiveness metrics 242 may change over time after repeated testing. Also, the response effectiveness metrics 242 may vary for different types of known indicators of compromise 106. For instance, the organization may exhibit a poorer response for network-related incidents as opposed to file-based incidents on network hosts 206.

The response effectiveness metrics 242 may be used for A/B testing of various components of the security infrastructure of the computing environment 203 to determine whether such components improve or reduce the effectiveness of the organization's security incident response. In some cases, the response effectiveness metrics 242 may be compared to a list of reference metrics in order to provide a recommendation as to which corrective actions should be taken to improve the organization's security incident response. The list of reference metrics could be created via a user interface by a system administrator, or the list of reference metrics could be created automatically via an aggregation of responses from many different sources. Where the security incident response testing service 109 is provided to third-party external organizations as a service, the corrective actions undertaken by many different organizations may be observed to see what those organizations did in order to improve security incident response. For example, organizations may replace or upgrade certain computing hardware, change parameters of network services, implement different firewall policies in response to detected events, and so on. The recommended corrective action may be communicated to an administrative user via rendering on a display.

In box 430, the security incident response testing service 109 may remove or purge the fake event from the event data 236. In doing so, the security incident response testing service 109 or another service may refer to the fabricated indicator of compromise log 239 in order to determine which data should be removed. Removal of the fake data may be especially useful if the event data 236 is to be provided to machine learning models, where the fake data may bias the machine learning models unnecessarily. In some cases, the event data 236 may include a discreet flag indicating that the particular data corresponds to a fabricated indicator of compromise and should be ignored for machine learning and/or other purposes. Thereafter, the operation of the portion of the security incident response testing service 109 ends.

In some embodiments, the security incident response testing service 109 can be provided as a service to multiple organizations. To provide the security incident response testing service 109 as an external service, the security incident response testing service 109 would be provided with access to inject fake events into the event data 236 as well as access to security incident response data 233 or other data in order to assess the response of the organization to the false alarm. In such cases, the security incident response testing service 109 may employ only indicators of compromise for which the intrusion detection system 112 of the organization is already configured to recognize. Alternatively, the security incident response testing service 109 may employ indicators of compromise that may or may not be recognizable by the intrusion detection system 112, which may allow for an assessment of the quality of the intrusion detection system 112, the intrusion detection system rules 251, or the indicators of compromise ingestion service 218 (FIG. 2) of the organization.

Figure 5:
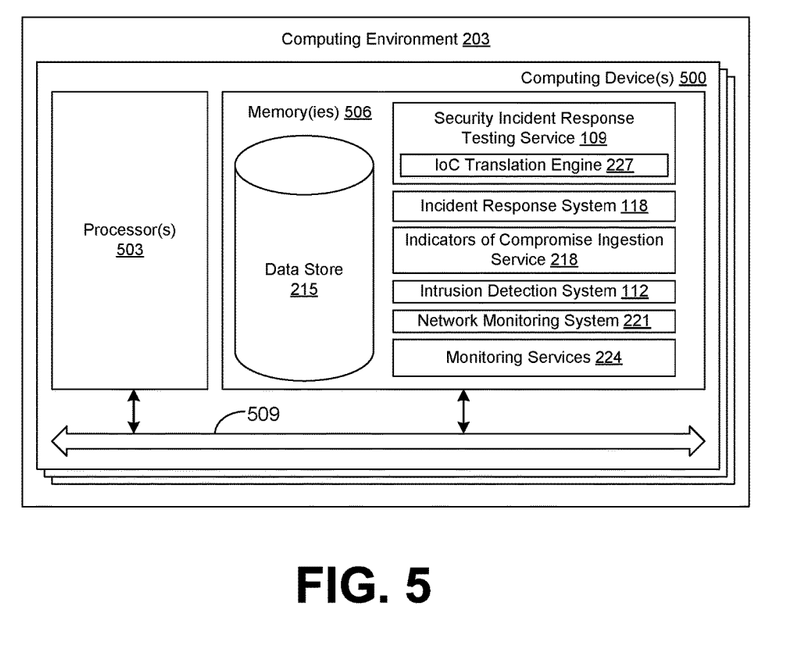
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the security incident response testing service 109, the indicator of compromise translation engine 227, the incident response system 118, the indicators of compromise ingestion service 218, the intrusion detection system 112, the network monitoring system 221, the monitoring services 224, and potentially other applications. Also stored in the memory 506 may be a data store 215 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503.

Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the security incident response testing service 109, the indicator of compromise translation engine 227, the incident response system 118, the indicators of compromise ingestion service 218, the intrusion detection system 112, the network monitoring system 221, the monitoring services 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the indicators of compromise ingestion service 218 and the security incident response testing service 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the security incident response testing service 109, the indicator of compromise translation engine 227, the incident response system 118, the indicators of compromise ingestion service 218, the intrusion detection system 112, the network monitoring system 221, and the monitoring services 224, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the security incident response testing service 109, the indicator of compromise translation engine 227, the incident response system 118, the indicators of compromise ingestion service 218, the intrusion detection system 112, the network monitoring system 221, and the monitoring services 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, wherein when executed the at least one program causes the at least one computing device to at least:
   receive a data feed of a plurality of known indicators of compromise from an external server;
   determine that a security incident response of an organization is to be tested;
   select a particular indicator of compromise of the plurality of known indicators of compromise to be a fabricated indicator of compromise;
   receive a stream of event data that is generated by a network monitoring system of the organization, wherein the stream of event data includes at least one event corresponding to operation of a network host monitored by the network monitoring system;
   modify the stream of event data to include fabricated data embodying the particular indicator of compromise;
   provide the stream of event data to an intrusion detection system of the organization, wherein the intrusion detection system is configured to identify the particular indicator of compromise as a security compromise;
   generate a plurality of metrics assessing a response of the organization to the particular indicator of compromise, wherein a first metric of the plurality of metrics indicates a timeliness of a security administrator response, and a second metric of the plurality of metrics indicates whether an expected action was performed as part of the security administrator response; and
   determine a corrective action by comparing the plurality of metrics to a list of manually created reference metrics; and
   cause a recommendation for the corrective action to be rendered via a display.

2. The non-transitory computer-readable medium of claim 1, wherein the fabricated data embodying the indicator of compromise includes a signature of a malware file.

3. The non-transitory computer-readable medium of claim 1, wherein the fabricated data embodying the indicator of compromise includes a destination network address corresponding to a known malware control server.

4. A system, comprising:
   at least one computing device; and
   an incident response testing service executable in the at least one computing device, wherein when executed the incident response testing service causes the at least one computing device to at least:
      receive a stream of event data generated by a network monitoring system of an organization, the stream of event data including at least one event corresponding to operation of a network host monitored by the network monitoring system;
      modify the stream of event data to include fabricated data embodying a fabricated indicator of compromise, wherein the stream of event data, after modification, is provided to an intrusion detection system of the organization, wherein the intrusion detection system is configured to identify the fabricated indicator of compromise as a security compromise; and
      generate at least one metric assessing a response of the organization to the fabricated indicator of compromise.

5. The system of claim 4, wherein the incident response testing service is further configured to cause the at least one computing device to at least:
   determine whether one or more user actions have been performed to investigate the security compromise identified by the intrusion detection system; and
   generate the at least one metric based at least in part on whether the one or more user actions have been performed.

6. The system of claim 4, wherein the incident response testing service is further configured to cause the at least one computing device to at least:
   determine an impact to a resource availability on a network of the organization by the response of the organization; and
   generate the at least one metric based at least in part on the impact to the resource availability.

7. The system of claim 4, wherein the incident response testing service is further configured to cause the at least one computing device to at least:
   record a first time relative to modifying the stream of event data; and
   generate the at least one metric based at least in part on an elapsed time between the first time and a second time corresponding to the response of the organization.

8. The system of claim 7, wherein the incident response testing service is further configured to cause the at least one computing device to at least generate the at least one metric based at least in part on a comparison of the elapsed time to a predefined target time.

9. The system of claim 7, wherein the second time is a time at which a user indication is received, via an incident response system, that the security compromise identified by the intrusion detection system is a false positive.

10. The system of claim 7, wherein the second time is a time at which a user indication is received, via an incident response system, that the security compromise is being investigated.

11. The system of claim 7, wherein the second time is a time at which an alarm is raised by the intrusion detection system in response to the security compromise being identified.

12. The system of claim 4, wherein the incident response testing service is further configured to cause the at least one computing device to at least randomly select the fabricated indicator of compromise from a plurality of known indicators of compromise.

13. The system of claim 4, wherein the incident response testing service is further configured to cause the at least one computing device to at least determine that the response of the organization is to be tested based at least in part on a randomly selected interval of time.

14. The system of claim 4, wherein the incident response testing service is further configured to cause the at least one computing device to at least receive a data feed describing the fabricated indicator of compromise from an external server.

15. The system of claim 4, wherein the incident response testing service is further configured to cause the at least one computing device to at least remove the fabricated data embodying the fabricated indicator of compromise from the stream of event data before the stream of event data is provided to a machine learning model.

16. The system of claim 4, wherein the at least one event comprises an event corresponding to a file installation on the network host.

17. A method, comprising:
receiving, via at least one of one or more computing devices, a stream of event data generated by a network monitoring system of an organization, wherein the stream of event data includes at least one event corresponding to operation of a network host monitored by the network monitoring system;
modifying, via at least one of the one or more computing devices, the stream of event data to include fabricated data embodying a fabricated indicator of compromise;
providing, via at least one of the one or more computing devices, the stream of event data that has been modified to an intrusion detection system of the organization, wherein the intrusion detection system is configured to identify the fabricated indicator of compromise as a security compromise; and
generating, via at least one of the one or more computing devices, at least one metric assessing a response of the organization to the fabricated indicator of compromise.

18. The method of claim 17, further comprising:
receiving, via at least one of the one or more computing devices, a data feed describing a plurality of known indicators of compromise from an external server; and
configuring, via at least one of the one or more computing devices, the intrusion detection system to recognize the plurality of known indicators of compromise as the security compromise.

19. The method of claim 17, further comprising removing, via at least one of the one or more computing devices, the fabricated indicator of compromise from the stream of event data that has been modified.

20. The method of claim 17, further comprising recording, via at least one of the one or more computing devices, a log indicating insertion of the fabricated indicator of compromise into the stream of event data.

* * * * *